United States Patent
Endo et al.

(10) Patent No.: US 7,494,542 B2
(45) Date of Patent: Feb. 24, 2009

(54) METHOD OF PREPARING A PIGMENT COMPOSITION

(75) Inventors: Atsushi Endo, Tokyo (JP); Takeshi Sato, Tokyo (JP); Akira Inoue, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 11/802,651

(22) Filed: May 24, 2007

(65) Prior Publication Data

US 2007/0272125 A1   Nov. 29, 2007

(30) Foreign Application Priority Data

May 26, 2006 (JP) ............................. 2006-146634
Dec. 1, 2006 (JP) ............................. 2006-325618

(51) Int. Cl.
*C09B 67/04* (2006.01)
*C09B 67/00* (2006.01)
*C09B 67/20* (2006.01)
*G02B 5/00* (2006.01)

(52) U.S. Cl. ................ 106/496; 106/494; 106/498; 349/106; 430/7

(58) Field of Classification Search .......... 106/494, 106/496, 498; 349/106; 430/7
See application file for complete search history.

(56) References Cited

U.S. PATENT DOCUMENTS 4,664,714 A * 5/1987 Katsura et al. ............ 106/411
5,264,032 A * 11/1993 Dietz et al. ............... 106/411
6,409,816 B1 * 6/2002 Weber et al. .............. 106/494
6,451,103 B1 * 9/2002 Uemura et al. ............ 106/493
7,002,021 B2 * 2/2006 Grimm et al. ............ 548/305.4
7,045,637 B2 * 5/2006 Weber et al. .............. 548/453

FOREIGN PATENT DOCUMENTS

| JP | 07-013016 | 1/1995 |
| JP | 10-245501 | 9/1998 |
| JP | 2001-220520 | 8/2001 |
| JP | 2004-277434 | 10/2004 |

* cited by examiner

*Primary Examiner*—Anthony J Green
(74) *Attorney, Agent, or Firm*—Nixon & Vanderhye P.C.

(57) ABSTRACT

A pigment composition can be prepared by wet or dry milling a pigment selected from the group consisting of dianthraquinone pigments, diketopyrrolopyrrole pigments and a mixture thereof, in the presence of a compound represented by Formula 1:

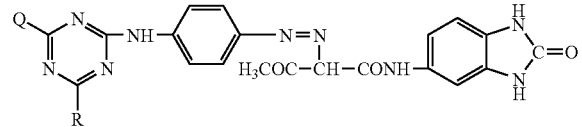

where Q denotes $-NH(CH_2)_nNR^1(R^2)$ group or hydroxyl group, and R denotes $-NH(CH_2)_nNR^1(R^2)$ group.

8 Claims, No Drawings

METHOD OF PREPARING A PIGMENT COMPOSITION

CROSS-REFERENCE TO RELATED APPLICATIONS

This application is based upon and claims the benefit of priority from prior Japanese Patent Applications No. 2006-146634, filed May 26, 2006; and No. 2006-325618, filed Dec. 1, 2006, the entire contents of both of which are incorporated herein by reference.

BACKGROUND OF THE INVENTION

1. Field of the Invention

The present invention relates to a method of preparing a pigment composition, and more particularly to a composition containing a dianthraquinone pigment and/or a diketopyrrolopyrrole pigment useful as pigments of a color filter used in, e.g., a color liquid crystal display device or a solid-state image sensing device.

2. Description of the Related Art

Conventionally, as a red pigment for a color filer used in, e.g., a color liquid crystal display device or a solid-state image sensing device, a dianthraquinone pigment or a diketopyrrolopyrrole pigment, which is high in brightness, and excellent in resistance to light and heat, has been used. However, pigments higher in brightness have been strongly required. To meet the requirement, the transparency must be improved by further decreasing the primary particle size of the pigment.

To decrease the primary particle size of a pigment, Jpn. Pat. Appln. KOKAI Publication No. 7-13016 discloses wet milling a pigment in the presence of a synthetic resin which is solid at room temperature and insoluble in water. Jpn. Pat. Appln. KOKAI Publication No. 2004-277434 discloses dry milling a pigment with addition of a small amount of an organic solvent which has a crystal growing function. Jpn. Pat. Appln. KOKAI Publication No. 10-245501 discloses wet milling a dianthraquinone pigment in the presence of an anthraquinone derivative. Further, Jpn. Pat. Appln. KOKAI Publication NO. 2001-220520 discloses wet milling a diketopyrrolopyrrole pigment in the presence of a pigment derivative.

However, the dianthraquinone pigments or the diketopyrrolopyrrole pigments obtained by these methods are insufficient in brightness, etc.

BRIEF SUMMARY OF THE INVENTION

Therefore, it is an object of the present invention is to provide a pigment composition which affords a red filter having a good brightness.

According to a first aspect of the present invention, there is provided a method of preparing a pigment composition comprising wet or dry milling a pigment selected from the group consisting of dianthraquinone pigments, diketopyrrolopyrrole pigments and a mixture thereof, in the presence of a compound represented by Formula 1:

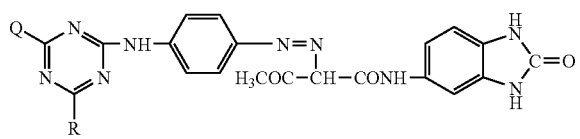

where Q denotes —NH(CH$_2$)$_n$NR$^1$(R$^2$) group or hydroxyl group; R denotes —NH(CH$_2$)$_n$NR$^1$(R$^2$) group; R$^1$ and R$^2$ each independently denote an alkyl group having 1 to 4 carbon atoms, or R$^1$ and R$^2$ may form, together with the nitrogen atom to which they are bonded, a nitrogen-containing 5- or 6-membered heterocyclic ring which may contain an additional nitrogen atom or an oxygen atom in the ring; and n denotes an integer of 1 to 4.

According to a second aspect of the present invention, there is provided a pigment composition prepared by a method of preparing a pigment composition according to the present invention.

According to a third aspect of the present invention, there is provided a pigment composition according to the present invention, and a pigment carrier dispersing the pigment composition therein.

DETAILED DESCRIPTION OF THE INVENTION

A method of preparing a pigment composition according to the present invention comprises wet or dry milling a pigment selected from the group consisting of dianthraquinone pigments, diketopyrrolopyrrole pigments and a mixture thereof, in the presence of a compound represented by Formula 1 noted above.

In Formula 1, Q denotes —NH(CH$_2$)$_n$NR$^1$(R$^2$) group or hydroxyl group, and R denotes —NH(CH$_2$)$_n$NR$^1$(R$^2$) group. R$^1$ and R$^2$ each independently denote an alkyl group having 1 to 4 carbon atoms, or R$^1$ and R$^2$ may form, together with the nitrogen atom to which they are bonded, a nitrogen-containing 5- or 6-membered heterocyclic ring which may contain an additional nitrogen atom or an oxygen atom in the ring. n denotes an integer of 1 to 4. Examples of the heterocyclic ring which R$^1$ and R$^2$ may form include a piperazine ring and a morpholine ring.

The compound represented by Formula 1 is described in, e.g., Jpn. Pat. Appln. KOKAI Publication No. 60-88185.

The compound represented by Formula 1 serves to suppress the crystal growth of the dianthraquinone pigments and/or diketopyrrolopyrrole pigments during the wet or dry milling. The compound represented by Formula 1 is used preferably in an amount of 0.5 to 20% by weight based on the weight of the dianthraquinone pigment or diketopyrrolopyrrole pigment or a mixture thereof used. An amount of the compound represented by Formula 1 exceeding 20% by weight is not preferable because the resistive properties of the pigments are impaired. The compound represented by Formula 1 is used most preferably in an amount of 2 to 15% by weight based on the weight of the dianthraquinone pigment or diketopyrrolopyrrole pigment or a mixture thereof used. The compound represented by Formula 1 may be added before or during the wet or dry milling.

In the present invention, the dianthraquinone pigment may be represented by Formula 2:

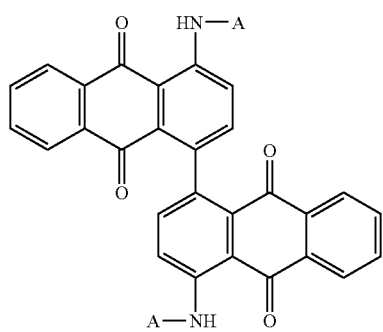

In formula 2, each A independently represents a hydrogen atom, an alkyl group which may have a substituent, or an aryl group which may have a substituent.

The alkyl group as the substituent A is preferably an alkyl group having 1 to 4 carton atoms, and the substituent on the alkyl group includes a halogen atom such as a chlorine atom, or a phenyl group.

The aryl group as the substituent A is preferably a phenyl group, and the substituent on the aryl group includes a halogen atom such as a chlorine atom, an alkyl group having 1 to 4 carbon atoms, or a phenyl group.

Commercially available dianthraquinone pigments include C.I. Pigment Red 89 and 177. For color filters, C.I. Pigment Red 177 is preferred in view of spectral characteristics.

In the present invention, the diketopyrrolopyrrole pigment may be represented by Formula 3:

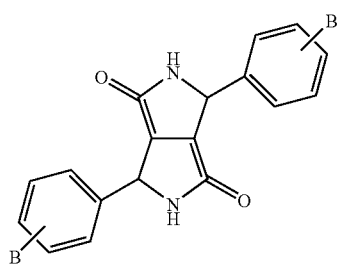

In Formula 3, each B independently denotes a hydrogen atom, an alkyl group which may have a substituent, an aryl group which may have a substituent, a cyano group or a halogen atom.

The alkyl group as the substituent B is preferably an alkyl group having 1 to 4 carbon atoms, and the substituent on the alkyl group includes a halogen such as a chlorine atom, or a phenyl group.

The aryl group as the substituent B is preferably a phenyl group, and the substituent on the aryl group includes a halogen atom such as a chlorine atom, an alkyl group having 1 to 4 carbon atoms such as a methyl, ethyl or t-butyl group, or a phenyl group.

The halogen atom as the substituent B is preferably a chlorine atom.

Commercially available diketopyrrolopyrrole pigments include C.I. Pigment Red 254, 255 and 264, and C.I. Pigment Orange 71. For color filters, C.I. Pigment Red 254 is preferred in view of spectral characteristics.

In the present invention, the dianthraquinone pigment or diketopyrrolopyrrole pigment, which is subjected to the wet or dry milling, may be in a coarse form containing coarse particles having a particle diameter of 1 μm or more, or may have an average particle diameter of 0.02 to 0.2 μm, generally used as pigments. Further, the dianthraquinone pigment and diketopyrrolopyrrole pigment may be mixed together, and the mixture may be subjected to the wet or dry milling.

In the present invention, the wet milling involves mechanically kneading a mixture containing the dianthraquinone pigment and/or diketopyrrolopyrrole pigment and the compound represented by Formula 1 above, together with a water-soluble inorganic salt and a water-soluble organic solvent which does not substantially dissolve the water-soluble inorganic salt, by using a kneading machine such as a kneader (this operation is referred to as salt milling), adding the kneaded material to water and stirring the material by using, e.g., a high speed mixer to form a slurry, which is then filtered and washed with water to remove the water-soluble inorganic salt and the water-soluble organic solvent.

The water-soluble inorganic salt serves as a milling aid. The pigment is milled, taking advantage of high hardness of the inorganic salt, during the salt milling, and the primary particle size of the pigment is reduced. The water-soluble inorganic salt is not particularly limited, as long as it is soluble in water, and sodium chloride, barium chloride, potassium chloride, sodium sulfate, for example, can be used. In view of the cost, it is preferred to use sodium chloride (table salt). The amount of the inorganic salt used in the wet milling is preferably 1 to 20 times, particularly 3 to 10 times the weight of the pigment, in view of treating efficiency and production efficiency. When the proportion of the inorganic salt with respect to the pigment is larger, the total amount to be treaded becomes large, though the efficiency is high in rendering the size of the pigment small.

The water-soluble organic solvent serves to wet the pigment, the compound represented by Formula 1 and the water-soluble inorganic solvent, and is not particularly limited as long as it is soluble in or miscible with water and does not substantially dissolve the water-soluble inorganic salt used. However, from the view point of safety, a high boiling solvent having a boiling point of 120°C. or more, since the temperature is raised during the wet milling and thus a solvent is likely to evaporate. As the water-soluble organic solvent, use may be made of, e.g., 2-methoxyethanol, 2-butxyethanol, 2-(isopentyloxy)ethanol, 2-(hexyloxy)ethanol, diethylene glycol, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, liquid polypropylene glycol. The water-soluble organic solvent may be used in an amount of 0.2 to 5.0%, based on the weight of the pigment used.

In the wet milling, a resin material may be added in order to prevent strong cohesion of pigment particles exhibited when the finely divided pigment is dried and to readily disperse the pigment particles in a transparent resin. By additionally using the resin, soft powdery pigment can be obtained. As such a resin, it is preferable to use a resin which is solid at room temperature insoluble in water and at least partially soluble in the water-soluble organic solvent, such as a natural resin, a modified natural resin, a synthetic resin, and a synthetic resin modified with a natural resin. Representative examples of the natural resin include rosins. Examples of the modified natural resin include a rosin derivative, a cellulose derivative, a rubber derivative, a protein derivative, and their oligomers. Examples of the synthetic resin include an epoxy resin, an acrylic resin, a maleic acid resin, a butyral resin, a polyester resin, a melamine resin, a phenolic resin, a polyurethane resin, and a polyamide resin. Examples of the synthetic resin modified with a natural resin include a rosin-modified maleic acid resin, and a rosin-modified phenolic resin. The amount of the additional resin is preferably 5 to 100% by weight based on the weight of the pigment used.

When the wet milling is conducted, an additive such as a pigment dispersant or a plasticizer, or an inorganic pigment generally used as an extender such as calcium carbonate, barium sulfate or silica may be additionally use. In addition, a pigment other than dianthraquinone and diketopyrrolopyrrole pigments may be added in order to adjust a color tone.

In the present invention, the dry milling involves milling a mixture containing the dianthraquinone pigment and/or diketopyrrolopyrrole pigment and the compound represented by Formula 1 above, using a dispersing apparatus incorporating therein a milling medium, without rendering the pigment liquid (in the dry state). As the dispersing apparatus, a ball mill, an attritor or a vibration mill may be used. The milling progresses through collision or friction of the milling medium. The milling apparatus may be reduced in its inner pressure, or filled with an inert gas such as nitrogen.

In the dry milling, an organic solvent which has a function of growing crystals of the pigment may be used in an amount which does not impair the dry state. The organic solvent is not particularly limited as long as it allows crystal growth of the pigment particles when it contacts the dianthraquinone or diketopyrrolopyrrole pigment. Examples of such a solvent include benzene, toluene, xylene, ethyl benzene, chlorobenzene, nitrobenzene, aniline, pyridine, quinoline, tetrahydrofuran, dioxane, methanol, ethanol, isopropanol, n-propanol, isobutanol, n-butanol, ethylene glycol, diethylene glycol, diethylene glycol monomethyl ether, diethylene glycol monoethyl ether, diethylene glycol monobutyl ether, propylene glycol, propylene glycol monomethyl ether acetate, ethyl acetate, isopropyl acetate, butyl acetate, hexane, heptane, octane, nonane, decane, undecane, dodecane, cyclohexane, methylcyclohexane, a halogenated hydrocarbon, acetone, methyl ethyl ketone, methyl isobutyl ketone, cyclohexanone, dimethylformamide, dimethylsulfoxide, and N-methylpyrrolidone. These solvent may be used in combination of two or more of these, if necessary.

In the dry milling, a resin may be added. The resin is not particularly limited. Examples of the resin include rosin, a rosin derivative, a rosin-modified maleic acid resin, a rosin-modified phenolic resin, a rubber derivative, a protein derivative, a chlorinated polyethylene, a chlorinated polypropylene, polyvinyl acetate, an epoxy resin, an acrylic resin, a maleic acid resin, a styrene resin, a styrene-maleic acid copolymer resin, a butyral resin, a polyester resin, a melamine resin, a phenolic resin, a polyurethane resin, a polyamide resin, a polyimide resin, an alkyd resin, a rubber resin, a cellulose, benzoguanamine resin, a urea resin, and an oligomer or a monomer of these resins.

The pigment composition of the present invention can provide a pigment dispersion by being dispersed in a pigment carrier comprising a vehicle. The pigment composition can be dispersed in the pigment carrier by using various dispersing apparatus such as a three-roll mill, a two-roll mill, a sand mill or a kneader. In order to obtain excellent dispersion, a dispersing aid such as a surfactant or a pigment derivative may be added.

In the present invention, the pigment carrier used in the pigment dispersion includes a vehicle for an ink, a paint, a colored plastic or a water-borne color.

Examples of the vehicle for an offset printing ink include a mixture of 20 to 50% by weight of a rosin-modified phenolic resin, a petroleum resin, an alkyd resin or a drying oil-modified derivative of these resins, 0 to 30% by weight of a drying oil such as linseed oil, a wood oil or an soybean oil, and 10 to 60% by weight of a solvent such as n-paraffin, isoparaffin, naphthene or α-olefin.

Examples of the vehicle for a gravure printing ink include a mixture of 10 to 50% by weight of a gum rosin, a wood rosin, a tall oil rosin, a lime rosin, a rosin ester, a maleic acid resin, a polyamide resin, a vinyl resin, a nitrocellulose, a cellulose acetate, an ethylcellulose, a chlorinated rubber, a cyclized rubber, an ethylene-vinyl acetate copolymer resin, a polyurethane resin, a polyester resin, an alkyd resin, an acrylic resin, a gilsonite, a dammar or a shellac or a mixture thereof, or a water-soluble resin in which the above resin is water-solubilized, or an emulsion resin thereof, and 30 to 80% by weight of a solvent such as a hydrocarbon, an alcohol, a ketone, an ether alcohol, an ether, an ester or water.

Examples of the vehicle for a pain include a mixture of 20 to 80% by weight of an acrylic resin, an alkyd resin, an epoxy resin, a chlorinated rubber, polyvinyl chloride, a synthetic resin emulsion, a silicone resin, a fluororesin, a polyurethane resin, a polyester resin, a melamine resin, a urea resin or a mixture thereof, or a water-soluble resin in which the above resin is water-solubilized, or an emulsion resin thereof, and 10 to 60% by weight of a solvent such as a hydrocarbon, an alcohol, a ketone, an ether alcohol, an ether, an ester or water.

Examples of the vehicle for a colored plastic include a polyethylene, a polypropylene, a polybutadiene, an ethylene-based ionomer, polyvinyl chloride, a polyvinylidene chloride, an ABS resin, an acrylic resin, a methacrylic resin, a polyvinyl alcohol, a cellulosic plastic, an epoxy resin, a polyester resin, a phenolic resin, a urea resin, a melamine resin, a polyurethane resin, a silicone resin, a polyamide resin, a polystyrene, a polyacetal, a polycarbonate, a polyphenylene ether, a polyphenylene sulfite, a polysulfone, a polyether imide, a polyether ketone, and a mixture thereof.

Examples of the vehicle for a water-borne color include a mixture of at least one member selected from a nonionic surfactant, an anionic surfactant, a surfactant cationic surfactants, a sulfonic amide dispersant, hydroxystearic dispersant and ε-caprolactam dispersant, with a polyhydric alcohol such as glycerin, ethylene glycol, triethylene glycol, propylene glycol or pentaerythritol, water, and optionally an auxiliary agent such as an amine, a preservative or an antifoaming agent.

The ink for a color filter contains, as the vehicle, a transparent resin, a precursor thereof, or a mixture of the transparent resin and the precursor. The transparent resin is a resin which has a light transmissivity of 80% or more, preferably 95% or more with respect to the whole visible wavelengths of 400 to 700 nm. The transparent resin includes a thermosetting resin, a thermoplastic resin and a photosensitive resin, and the precursor of the transparent resin includes a monomer and an oligomer which produces a coating film like the resin upon curing by irradiation of radiation, and these can be used singly or in combination. It is preferable to use a resin which has a good resistance to heat since the resin is subjected to a high temperature treatment in the process of preparing a color filter. Also, a resistance to a solvent and a resistance to a chemical are required for the resin since treatments with the solvent and the chemical are carried out in preparing a color filter.

In the ink for a color filter, the pigment composition and the vehicle are preferably used at a weight ratio of 1:4 to 10:1 on the solid basis.

Examples of the thermosetting and thermoplastic resins include, for example, a butyral resin, a styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a phenolic resin, a polyester resin, an acrylic resin, an alkyd resin, a polystyrene resin, a polyamide resin, a rubber resin, a cyclized rubber resin, an epoxy resin, a cellulose, a polybutadiene, a polyimide resin, a benzoguanamine resin, a melamine resin, and a urea resin.

Examples of the photosensitive resin used in the ink for a color filter include a resin which is produced by introducing a photocrosslinkable group such as a (meth)acrylic compound or cinnamic acid into a linear polymer having a reactive substituent such as a hydroxyl group, a carboxyl group or an amino group, through an isocyanato group, an aldehydo group or an epoxy group. In addition, a polymer obtained by partial esterification of a linear polymer containing an acid anhydride, such as a styrene-maleic anhydride copolymer or an α-olefin-maleic anhydride copolymer, with a hydroxyl group-containing (meth)acrylic compound such as hydroxyalkyl(meth)acrylate can also be used.

Examples of the monomer and oligomer used in the ink for a color filter, which forms a coating film like the resin, upon curing by the irradiation of radiation, include, for example, various acrylic and methacrylic acid esters such as 2-hydroxyethyl(meth)acrylate, 2-hydroxypropyl(meth)acrylate, cyclohexyl(meth)acrylate, a polyethylene glycol di(meth)acrylate, pentaerythritol tri(meth)acrylate, dipentaerythritol hexa(meth)acrylate, tricyclodecanyl(meth)acrylate, hexa(meth)acrylate of caprolactone adduct of dipentaerythritol hexa (meth)acrylate, a melamine (meth)acrylate, and an epoxy (meth)acrylate prepolymer; (meth)acryl acid; styrene; vinyl acetate; hydroxylethyl vinyl ether; ethyleneglycol divinyl ether; pentaerythritol trivinyl ether; (meth)acrylamide; N-hydroxymethyl(meth)acrylamide; styrene; vinyl acetate; and acrylonitrile.

The ink for a color filter prepared as a resist ink contains a photopolymerization initiator if the ink is cured by UV irradiation.

Examples of the photopolymerization initiator include, for example, acetophenone photopolymerization initiators such as 4-phenoxy-dichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, and 2-benzyl-2-dimethylamino-1-(4-morpholinophenyl)-butan-1-one; benzoin photopolymerization initiators such as benzoin, benzoin methylether, benzoin ethylether, benzoin isopropylether, and benzyldimethyl ketal; benzophenone photopolymerization initiators such as benzophenone, benzoylbenzoic acid, methyl benzoylbenzoate, 4-phenylbenzophenone, hydroxybenzophenone, acrylated benzophenones, and 4-benzoyl-4'-methyl diphenylsulfide; thioxanthone photopolymerization initiators such as thioxanthone, 2-chlorothioxanthone, 2-methylthioxanthone, isopropylthioxanthone, and 2,4-diisopropylthioxanthone; triazine photopolymerization initiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphto-1-yl)-4,6-bis(trichloromethyl)-s-triazine, 2-(4-methoxy-naphto-1-yl)-4,6-bis(trichloromethyl)-s-triazine, 2,4-trichloromethyl-(piperonyl)-6-triazine, and 2,4-trichloromethyl(4'-methoxystyryl)-6-triazine; carbazole photopolymerization initiators; and imidazole photopolymerization initiators. The photopolymerization initiator may be used in an amount of 5 to 200 parts by weight, preferably 10 to 150 parts by weight, based on 100 parts by weigh of the pigment composition used.

The photopolymerization initiators can be used alone or in combination, but may be used together with a sensitizer, such as α-acyloxime ester, acylphosphine oxide, methylphenyl glyoxylate, benzil, 9,10-phenanthrenequinone, camphorquinone, ethylanthraquinone, 4,4'-diethylisophthalophenone, 3,3',4,4'-tetra(t-butylperoxycarbonyl)benzophenone or 4,4'-diethylaminobenzophenone. The sensitizer may be used in an amount of 0.1 to 60 parts by weight, based on 100 parts by weight of the photopolymerization initiator used.

The ink for a color filter preferably contains a solvent in order to sufficiently disperse the pigment composition in the vehicle and facilitate coating of the ink onto a substrate such as a glass substrate to a dry thickness of 0.5 to 5 μm. Examples of the solvent include, for example, cyclohexanone, ethylcellosolve acetate, butylcellosolve acetate, 1-methoxy-2-propyl acetate, diethylene glycol dimethyl ether, ethylbenzene, diethyleneglycol diethyl ether, xylene, ethylcellosolve, methyl n-amyl ketone, propylene glycol monomethyl ether, toluene, methyl ethyl ketone, ethyl acetate, methanol, ethanol, isopropyl alcohol, butanol, isobutyl ketone and a petroleum solvent. These solvent can be used singly or in combination. The total amount of the solvents used may be 800 to 4,000 parts by weight, preferably 1000 to 2500 parts by weight, based on 100 parts by weight of the pigment composition used.

The present invention will be described below by way of Examples. In Examples, "part(s)" denotes part(s) by weight, and "%" denotes % by weight. The primary particle size of the pigment was measured under observation by a transmission electron microscope, and the specific surface area was measured by BET method. The compounds represented by Formula 1, which were used in Examples below are shown in Table 1 below. The pigment derivatives described in Examples given in Jpn. Pat. Appln. KOKAI Publication No. 2001-220520, which were used in Comparative Examples, are shown in Table 2 below.

TABLE 1

Compounds represented by Formula 1

| Compound name | Q in Formula 1 | R in Formula 1 |
|---|---|---|
| Compound (a) | —NHCH$_2$N(CH$_3$)$_2$ | —NHCH$_2$N(CH$_3$)$_2$ |
| Compound (b) | —OH | —NH(CH$_2$)$_2$N(C$_2$H$_5$)$_2$ |
| Compound (c) | —NH(CH$_2$)$_3$N(C$_4$H$_9$)$_2$ | —NH(CH$_2$)$_3$N(C$_4$H$_9$)$_2$ |
| Compound (d) | —OH | —NH(CH$_2$)$_4$N(C$_3$H$_7$)$_2$ |

TABLE 2

Pigment derivative of Jpn. Pat. Appln. KOKAI Publication No. 2001-220520

| Pigment derivative | Basic organic pigment | Substituent |
|---|---|---|
| Pigment derivative (e) | C.I. Pigment Red 255 | —SO$_2$NH(CH$_2$)$_3$N(CH$_3$)$_2$ |
| Pigment derivative (f) | C.I. Pigment Violet 19 | —SO$_2$NH(CH$_2$)$_3$N(CH$_3$)$_2$ |

<Preparation of Acrylic Resin Solution>

800 parts of cyclohexanone were charged into a reaction vessel and heated to 100° C., while introducing nitrogen gas into the vessel. Then a mixture of 60.0 parts of styrene, 60.0 parts of methacrylic acid, 65.0 parts of methyl methacrylate, 65.0 parts of butyl methacrylate and 10.0 pats of azobisisobutyronitrile was added dropwise to effect the polymerization reaction. After the dropwise addition, the reaction was continued additionally for 3 hours, and a solution of 2.0 parts of azobisisobutyronitrile in 50 parts of cyclohexanone was added. Then, the reaction was continued further for one hour at 100° C., giving a resin solution.

EXAMPLE 1

144 parts of a diketopyrrolopyrrole (DPP) pigment (IRGAZIN DPP RED BO available from Ciba Specialty Chemicals: C.I. Pigment Red 254), 16 parts of compound (a), 1600 parts of sodium chloride and 190 parts of diethylen glycol were charged into a one-gallon stainless steel kneader (available from Inoue Seisakusho), and kneaded at 60° C. for 10 hours. Then, the mixture was added to 3 liters of warm water, and stirred with a high speed mixer for about one hour, while heating to about 80° C., giving a slurry. The slurry was repeatedly filtered and washed with water to remove the sodium chloride and the solvent, and dried at 80° C. overnight, giving 156.0 parts of a pigment composition for a color filter (primary particle size: 30-40 nm; specific surface area: 88 m$^2$/g).

EXAMPLE 2

The same procedures were followed as in Example 1, except that the DPP pigment was changed to a diaminodianthraquinone pigment, CROMOPHTAL RED A2B (C.I. Pigment Red 177), and compound (a) to compound (b), giving 158.1 parts of a pigment composition for a color filter (primary particle size: 30-40 nm; specific surface area: 92 m$^2$/g).

EXAMPLE 3

The same procedures were followed as in Example 1, except that compound (a) was changed to compound (c), giving 156.5 parts of a pigment composition for a color filter (primary particle size: 30-40 nm; specific surface area: 89 m$^2$/g).

EXAMPLE 4

The same procedures were followed as in Example 1, except that the amount of the DPP pigment was changed from 144 parts to 136 parts, and 16 parts of compound (a) was changed to 24 parts of compound (d), giving 156.0 parts of a pigment composition for a color filter (primary particle size: 20-30 nm; specific surface area: 95 m$^2$/g).

COMPARATIVE EXAMPLE 1

The same procedures were followed as in Example 1, except that compound (a) was not used, giving 149.0 parts of a treated pigment (primary particle size: 40-50 nm; specific surface area: 81 m$^2$/g).

COMPARATIVE EXAMPLE 2

The same procedures were followed as in Example 2, except that compound (b) was not used, giving 149.0 parts of a treated pigment (primary particle size: 60-80 nm; specific surface area: 65 m$^2$/g).

COMPARATIVE EXAMPLE 3

The same procedures were followed as in Example 1, except that compound (a) was changed to pigment derivative (e), giving 151.2 parts of a treated pigment (primary particle size: 30-40 nm; specific surface area: 85 m$^2$/g).

COMPARATIVE EXAMPLE 4

The same procedures were followed as in Example 1, except that compound (a) was changed to pigment derivative (f), giving 152.0 parts of a treated pigment (primary particle size: 30-40 nm; specific surface area: 87 m$^2$/g).

EXAMPLE 5

54 parts of a DPP pigment (IRGAZIN DPP RED BO available from Ciba Specialty Chemicals: C.I. Pigment Red 254), 6 parts of compound (a), and 2000 parts of steel balls having a diameter of 9 mm were charged into a one-liter attritor, and stirred for one hour. The steel balls were separated from the mixture, giving 51 parts of a pigment composition.

EXAMPLE 6

The same procedures were followed as in Example 5, except that the DPP pigment was changed to a diaminodianthraquinone pigment, CROMOPHTAL RED A2B (C.I. Pigment Red 177), and compound (a) to compound (b), giving 51 parts of a pigment composition.

EXAMPLE 7

The same procedures were followed as in Example 5, except that compound (a) was changed to compound (c), giving 51 parts of a pigment composition.

EXAMPLE 8

The same procedures were followed as in Example 5, except that the amount of the DPP pigment was changed from 54 parts to 51 parts, and 6 parts of compound (a) was changed to 9 parts of compound (d), giving 50 parts of a pigment composition.

COMPARATIVE EXAMPLE 5

The same procedures were followed as in Example 5, except that compound (a) was not used, giving 52 parts of a treated pigment.

COMPARATIVE EXAMPLE 6

The same procedures were followed as in Example 6, except that compound (b) was not used, giving 52 parts of a treated pigment.

COMPARATIVE EXAMPLE 7

The same procedures were followed as in Example 5, except that compound (a) was changed to pigment derivative (e), giving 52 parts of a pigment composition.

COMPARATIVE EXAMPLE 8

The same procedures were followed as in Example 5, except that compound (a) was changed to pigment derivative (f), giving 52 parts of a pigment composition.

A mixture of the following composition containing one of the pigment compositions or treated pigments prepared in Examples 1-8 and Comparative Examples 1-8 was mixed and stirred uniformly, and filtered with a 1 μm filter, affording an alkali-developing photosensitive colored composition.

| <Composition of photosensitive colored composition> | |
|---|---|
| Pigment composition or treated pigment | 4.5 parts |
| Acrylic resin solution noted above | 24.0 parts |
| Trimethylolpropane triacrylate (NK ESTER ATMPT available from Sin-Nakamura chemical) | 5.4 parts |
| Photopolymerization initiator | 0.3 parts |

-continued

| <Composition of photosensitive colored composition> | |
|---|---|
| (IRGACURE 907 available from Ciba Specialty Chemicals) Sensitizer (EAB-F available from Hodogaya Chemical) | 0.2 parts |
| Cyclohexanone | 65.1 parts |

Each photosensitive colored composition was coated on a glass substrate of 100 mm×100 mm with a thickness of 1.1 mm, using a spin coater, giving a coated substrate. The coated substrate was dried at 70° C. for 20 minutes, and exposed with ultraviolet light, using a ultra-high pressure mercury lamp, at an integrated light amount of 150 mJ. After the exposure, the substrate was heated at 230° C. for one hour, and allowed to cool. Then, the chromaticity (Y, x, and y) of the substrate was measured with a C light source, using a microspectrophotometer (OSP-SP 100 available from Olympus). The above coating operation was repeated with the number of revolutions of the spin coater changed, and the thickness of the coating on the substrate was adjusted such that the chromaticity, x, of the substrate became 0.6. The brightness was compared using Y values of the substrate having the thickness of the coating adjusted. The results are shown in Tables 3 and 4.

As is shown in Tables 3 and 4, the substrates coated with the photosensitive colored composition containing the pigment compositions of Examples 1-8 exhibited higher Y values and were excellent in brightness compared to the substrates coated with the photosensitive colored composition containing the pigment compositions of Comparative Examples 1-8.

TABLE 3

| Ex. No. | Pigment used | Compound or Pigment derivative used | Chromaticity | | |
|---|---|---|---|---|---|
| | | | Y | x | y |
| Ex. 1 | IRGAZIN DPP RED BO | Compound (a) | 25.5 | 0.600 | 0.331 |
| Ex. 2 | CROMOPHTAL RED A2B | Compound (b) | 18.3 | 0.600 | 0.292 |
| Ex. 3 | IRGAZIN DPP RED BO | Compound (c) | 25.8 | 0.600 | 0.334 |
| Ex. 4 | IRGAZIN DPP RED BO | Compound (d) | 24.6 | 0.600 | 0.330 |
| Comp. Ex. 1 | IRGAZIN DPP RED BO | None | 20.2 | 0.600 | 0.325 |
| Comp. Ex. 2 | CROMOPHTAL RED A2B | None | 16.4 | 0.600 | 0.286 |
| Comp. Ex. 3 | IRGAZIN DPP RED BO | Pigment derivative (e) | 22.3 | 0.600 | 0.318 |
| Comp. Ex. 4 | IRGAZIN DPP RED BO | Pigment derivative (f) | 22.1 | 0.600 | 0.316 |

TABLE 4

| Ex. No. | Pigment used | Compound or Pigment derivative used | Chromaticity | | |
|---|---|---|---|---|---|
| | | | Y | x | y |
| Ex. 5 | IRGAZIN DPP RED BO | Compound (a) | 23.8 | 0.600 | 0.331 |
| Ex. 6 | CROMOPHTAL RED A2B | Compound (b) | 17.5 | 0.600 | 0.292 |
| Ex. 7 | IRGAZIN DPP RED BO | Compound (c) | 23.2 | 0.600 | 0.334 |
| Ex. 8 | IRGAZIN DPP RED BO | Compound (d) | 22.4 | 0.600 | 0.330 |
| Comp. Ex. 5 | IRGAZIN DPP RED BO | None | 18.0 | 0.600 | 0.325 |
| Comp. Ex. 6 | CROMOPHTAL RED A2B | None | 14.8 | 0.600 | 0.286 |
| Comp. Ex. 7 | IRGAZIN DPP RED BO | Pigment derivative (e) | 19.5 | 0.600 | 0.318 |
| Comp. Ex. 8 | IRGAZIN DPP RED BO | Pigment derivative (f) | 19.4 | 0.600 | 0.316 |

What is claimed is:

1. A method of preparing a pigment composition comprising wet or dry milling a pigment selected from the group consisting of dianthraquinone pigments, diketopyrrolopyrrole pigments and a mixture thereof, in the presence of a compound represented by Formula 1:

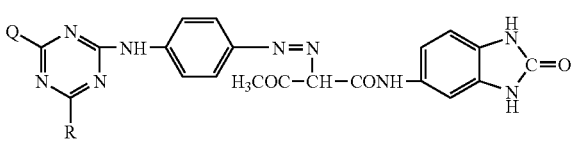

where Q denotes $-NH(CH_2)_n NR^1(R^2)$ group or hydroxyl group; R denotes $-NH(CH_2)_n NR^1(R^2)$ group; $R^1$ and $R^2$ each independently denote an alkyl group having 1 to 4 carbon atoms, or $R^1$ and $R^2$ may form, together with the nitrogen atom to which they are bonded, a nitrogen-containing 5- or 6-membered heterocyclic ring which may contain an additional nitrogen atom or an oxygen atom in the ring; and n denotes an integer of 1 to 4 wherein the wet milling is carried out by kneading a mixture comprising the pigment, the compound, a water-soluble inorganic salt and a watersoluble organic solvent which does not substantially dissolve the inorganic salt, adding the kneaded mixture to water, stirring the resultant mixture to form a slurry. and filtering and water washing the slurry to remove the inorganic salt and the organic solvent.

2. The method according to claim 1, wherein the compound is used in an amount of 0.5 to 20% by weight based on the weight of the pigment.

3. The method according to claim 1, wherein the dry milling is carried out by milling a mixture comprising the pigment and the compound in a dry state, using a disperser containing milling media.

4. The method according to claim 1, wherein the pigment is a dianthraquinone pigment and is represented by Formula 2:

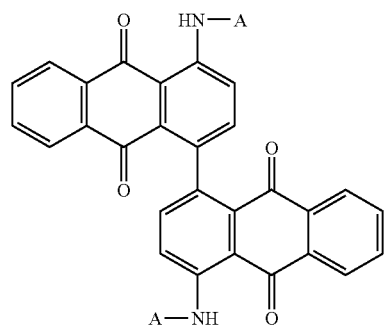

where each A independently denotes a hydrogen atom, an alkyl group which may have a substituent, or an aryl group which may have a substituent.

5. The method according to claim 1, wherein the pigment is a diketopyrrolopyrrole pigment and is represented by Formula 3:

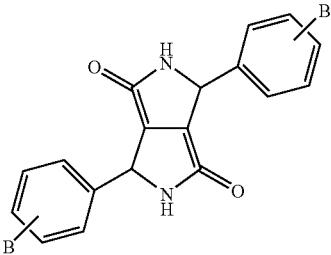

where each B independently denotes a hydrogen atom, an alkyl group which may have a substituent, an aryl group which may have a substituent, a cyano group or a halogen atom.

6. A pigment composition prepared by the method according to claim 1.

7. A pigment dispersion comprising the a pigment composition according to claim 6, and a pigment carrier dispersing the pigment composition therein.

8. A color filter which contains a pigment composition according to claim 6.

* * * * *